United States Patent Office 3,347,863
Patented Oct. 17, 1967

3,347,863
PROCESS FOR BASIC ALUMINUM SALT
OF PYRIDINETHIONE
Gerhard F. Ottmann, Hamden, and Irene M. Voynick,
New Haven, Conn., assignors to Olin Mathieson Chemical Corporation, a corporation of Virginia
No Drawing. Filed June 29, 1964, Ser. No. 379,003
5 Claims. (Cl. 260—270)

ABSTRACT OF THE DISCLOSURE

Basic aluminum salt of 1-hydroxy-2-pyridinethione prepared by adding 1-hydroxy-2-pyridinethione to an aqueous suspension of freshly prepared aluminum hydroxide in a molar ratio in the range between about 1.1:1 and about 2.9:1, and recovering the basic aluminum salt produced thereby.

---

This invention relates to basic aluminum salts of 1-hydroxy-2-pyridinethiones and to the method for preparing them.

Heavy metal salts of 1-hydroxy-2-pyridinethione have been prepared previously by adding chlorides of heavy metals in dilute hydrochloric acid solution to the pyridinethione compound. The presence of the hydrochloric acid solution in this method required neutralization with a base such as sodium hydroxide and subsequent filtration to obtain the solid heavy metal salt of 1-hydroxy-2-pyridinethione. Although many metal salts of 1-hydroxy-2-pyridinethione are readily prepared by this technique, the process was not satisfactory for the preparation of the basic aluminum salt of 1-hydroxy-2-pyridinethione.

It is a primary object of this invention to provide a method for the preparation of basic aluminum salts of 1-hydroxy-2-pyridinethione.

Another object of the invention is to provide basic aluminum salts of 1-hydroxy 2-pyridinethione.

These and other objects of the invention will be apparent from the following detailed description.

It has now been discovered the foregoing objects are accomplished and that basic aluminum salts of 1-hydroxy-2-pyridinethione are readily prepared by adding 1-hydroxy-2-pyridinethione to an aqueous suspension of freshly prepared aluminum hydroxide. The resulting solid aluminum salt of 1-hydroxy-2-pyridinethione is separated from the liquid, washed, and then heated to dryness.

More in detail, the 1-hydroxy-2-pyridinethione reactant of this invention is represented by the formula:

I

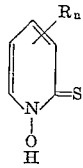

where R is selected from the group consisting of hydrogen, lower alkyl, lower alkoxy and halogen, and where $n$ is a positive integer less than five. Typical examples of suitable compounds represented by Formula I include 1-hydroxy-2-pyridinethione;
1-hydroxy-3(4, 5, or 6)-methyl-2-pyridinethione;
1-hydroxy-3(4, 5, or 6)-ethyl-2-pyridinethione;
1-hydroxy-3(4, 5, or 6)-n-butyl-2-pyridinethione;
1-hydroxy-3(4, 5, or 6)-methoxy-2-pyridinethione;
1-hydroxy-3(4, 5, or 6)-ethoxy-2-pyridinethione;
1-hydroxy-3(or 5)-bromo-2-pyridinethione;
1-hydroxy-3(or 5)-chloro-2-pyridinethione;
1-hydroxy-4,6(or 3,6 or 5,6)-dimethyl-2-pyridinethione;
1-hydroxy-4,6(or 3,6 or 5,6)-diethyl-2-pyridinethione;
1-hydroxy-2(4, 5, or 6)-ethyl-6(3,4 or 5)-methyl-2-pyridinethione;
1-hydroxy-4,5(or 3,6 or 5,6)-di-methoxy-2-pyridine-thione;
1-hydroxy-3,5-dibromo-2-pyridinethione;
1-hydroxy-3,5-dichloro-2-pyridinethione;
1-hydroxy-4,5,6-trimethyl-2-pyridinethione;
1-hydroxy-3,4,5,6-tetramethyl-2-pyridinethione;

mixtures thereof, and the like.

It will be recognized by those skilled in the art that the 1-hydroxy-2-pyridinethione reactant is in tautomeric equilibrium with the corresponding 2-mercapto-pyridine-1-oxide, which is represented by the following formula:

II

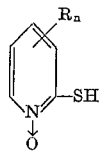

where R and $n$ have the meanings described above. To simplify the description and claims, the term 1-hydroxy-2-pyridinethione and Formula I will be used in the description and claims to represent both tautomeric forms of the pyridinethione compounds shown in Formulae I and II.

The aluminum hydroxide reactant is preferably prepared by reacting aluminum sulfate with ammonium hydroxide in aqueous solution to afford a precipitate of the composition $Al(OH)_3 \cdot xH_2O$. The precipitated aluminum hydroxide is separated from the solution by filtration or other suitable solids-liquid separation technique, and is then preferably washed free of ammonium sulfate. The resulting washed solid may be then suspended in water for reaction with 1-hydroxy-2-pyridinethione, or if desired, may be quickly air dried, pulverized if necessary, and then suspended in water prior to the reaction. If desired, any other convenient technique for preparing aluminum hydroxide may be employed.

In order to obtain the basic aluminum salts of this invention, it is important to use freshly prepared aluminum hydroxide. When aluminum hydroxide is stored for extended periods (for example, for more than about 3 days), polymerization of the aluminum hydroxide is effected by the formation of water and the formation of Al—O—Al bonds between hydroxyl groups of two different molecules of aluminum hydroxide.

As the storage period increases, the number of hydroxyl groups decreases, thereby markedly decreasing the chance of forming the basic aluminum salt when the stored material is reacted with the 1-hydroxy-2-pyridinethione.

The aluminum hydroxide reactant is suspended in water prior to reaction with the pyridinethione compound. The proportion of water employed to prepare the aluminum hydroxide slurry or suspension is generally in the range between about 10 and about 30 parts of water for each part of aluminum hydroxide, but greater or lesser proportions may be used if desired. The slurry is agitated with sufficient force to form a substantially homogeneous suspension.

In carrying out the process of this invention it is critical to add the 1-hydroxy-2-pyridinethione compound to the slurry of aluminum hydroxide, rather than employing the reverse procedure. The basic aluminum salt is readily formed when the pyridinethione compound is added to the aluminum hydroxide. When the reverse procedure is employed, the basic aluminum salt is not formed.

The reaction temperature is generally in the range between about 10 and about 60° C. and preferably between about 25 and about 40° C., but higher or lower temperatures may be employed if desired.

The pressure is not critical and any convenient pressure may be employed.

The reaction is ionic and thus is substantially instantaneous. However, since the reaction proceeds in a heterogeneous phase, it is preferred to continue agitation for several hours after complete addition of the pyridinethione compound has been made. A constant pH indicates the completeness of the reaction.

The proportion of reactants employed may be in the range between about 1.1 moles and about 2.9 moles, but is preferably in the range between about 1.7 and about 2.3 moles of the 1-hydroxy-2-pyridinethione compound per mole of aluminum hydroxide. Maximum yield of the basic aluminum salt is obtained when stoichiometric proportions of the reactants are employed.

The reaction of the novel process of this invention is represented by the following formula:

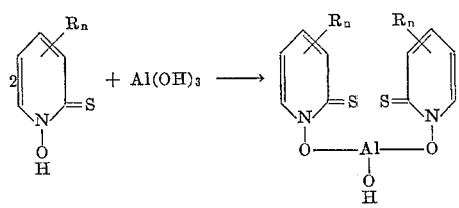

where R and $n$ have the above-defined meanings.

The formula for the tautomeric form of the basic aluminum salt is as follows:

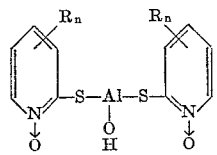

where R and $n$ have the above-defined meanings.

The basic aluminum salt of this invention is an active bactericide and fungicide. It is effective in the control of fungi associated with the destruction of cotton fabrics and the like, and can be used as a preservative in leather, paper, paints, plastics and most fabrics to inhibit attack by mildew or other fungus.

The aluminum salt of this invention is also used either as a foliage fungicide and bactericide, or as a soil fungicide.

The following examples are presented to illustrate the invention more fully without any intention of being limited thereby.

Example I 12.2 g. of freshly prepared aluminum hydroxide was slurried in 250 ml. of distilled water giving a pH of 4.2. 22 g. of 1-hydroxy-2-pyridinethione was added at room temperature with stirring. Stirring was continued until the pH value of the reaction mixture remained constant. The final pH was 3.8. The resulting solid product was suction filtered and was washed with acetone two times. After drying the solid, 20.6 g. of fine white powder was obtained having a capillary melting point of 254.5–257° C. (decomposition). Chemical analysis of the product indicated that the solid product was the basic aluminum salt of 1-hydroxy-2-pyridinethione, as represented by Formulas III and IV where R is hydrogen and $n$ is 4. The theoretical and measured analyses are as follows:

Theory: C, 40.53; H, 3.06; N, 9.46; Al, 9.12; S, 21.65; N→O, 20.2. Found: C, 40.99; H, 3.38; N, 9.45; Al, 8.41; S, 21.62; N→O, 19.5.

Example II

A solution of 0.3 mole of aluminum sulfate hydrate was treated with 1230 milliliters of a 2 N ammonium hydroxide solution. The aluminum hydroxide which formed was suction filtered, washed thoroughly and air-dried. The product was pulverized and slurried in 1700 ml. of distilled water. 1.2 moles of 1-hydroxy-2-pyridinethione was added at room temperature (27°) while stirring. After several hours, the product was suction filtered and washed with acetone three times. On drying, 126.4 g. of chalk-like powder was obtained. The capillary melting point of the product was found to be 254–258.5° C. (decomposition). Analysis of the basic aluminum salt was as follows:

Theory: N→O, 20.2. Found: 20.1, 19.6.

Various modifications of the invention, some of which have been referred to above, may be employed without departing from the spirit of the invention.

What is claimed is:

1. A process for preparing the basic aluminum salt of 1-hydroxy-2-pyridinethione which comprises adding 1-hydroxy-2-pyridinethione to an aqueous slurry of freshly prepared aluminum hydroxide, wherein the molar ratio of said 1-hydroxy-2-pyridinethione to said aluminum hydroxide is in the range between about 1.1:1 and about 2.9:1, and recovering the basic aluminum salt produced thereby.

2. The process of claim 1 wherein the molar ratio of said 1-hydroxy-2-pyridinethione to said aluminum hydroxide is in the range between about 1.7:1 and about 2.3:1.

3. The process of claim 1 wherein the molar ratio of said 1-hydroxy-2-pyridinethione to said aluminum hydroxide is about 2:1.

4. The process of claim 1 wherein the reaction temperature is in the range between about 10 and about 60° C.

5. The process of claim 1 which comprises adding 1-hydroxy-2-pyridinethione to an aqueous slurry of freshly prepared aluminum hydroxide, the molar ratio of said 1-hydroxy-2-pyridinethione to said aluminum hydroxide being in the range between about 1.7:1 and about 2.3:1, said reaction being carried out at a temperature in the range between about 25 and about 40° C., and recovering the basic aluminum salt produced thereby.

References Cited

UNITED STATES PATENTS

| | | | |
|---|---|---|---|
| 2,809,971 | 10/1957 | Bernstein et al. | 260—370 |
| 2,909,459 | 10/1959 | Hovey et al. | 167—33 |
| 3,200,136 | 8/1965 | Grossmuth | 167—90 X |
| 3,235,455 | 2/1966 | Judge et al. | |

NICHOLAS S. RIZZO, *Primary Examiner.*

D. G. DAUS, *Assistant Examiner.*